(12) United States Patent
Peck

(10) Patent No.: US 7,090,171 B2
(45) Date of Patent: Aug. 15, 2006

(54) MOMENTUM STABILIZED LAUNCH VEHICLE UPPER STAGE

(75) Inventor: Mason A. Peck, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/427,111

(22) Filed: Apr. 30, 2003

(65) Prior Publication Data
US 2004/0135035 A1   Jul. 15, 2004

Related U.S. Application Data

(60) Provisional application No. 60/439,834, filed on Jan. 14, 2003.

(51) Int. Cl.
B64G 1/64 (2006.01)

(52) U.S. Cl. .................................. 244/173.2

(58) Field of Classification Search ............ 244/158 R, 244/161, 165; 267/140.15, 140.14, 219; 248/550, 566
See application file for complete search history.

(56) References Cited

U.S. PATENT DOCUMENTS

| | | | |
|---|---|---|---|
| 3,955,858 A | 5/1976 | Poubeau | |
| 4,071,211 A | 1/1978 | Muhlfelder et al. | |
| 4,288,051 A | 9/1981 | Goschel | |
| 4,300,737 A | 11/1981 | Byrne et al. | |
| 4,618,112 A * | 10/1986 | Keigler | 244/158 R |
| 4,824,052 A | 4/1989 | Smay et al. | |
| 5,064,152 A | 11/1991 | Maute | |
| 5,163,640 A * | 11/1992 | Altobelli | 244/164 |
| 5,169,094 A | 12/1992 | Maute et al. | |
| 5,249,783 A | 10/1993 | Davis | |
| 5,305,981 A * | 4/1994 | Cunningham et al. | 248/550 |
| 5,332,070 A | 7/1994 | Davis et al. | |
| 5,582,369 A | 12/1996 | Blancke | |
| 5,647,561 A * | 7/1997 | Robinson et al. | 244/158 R |
| 5,655,757 A * | 8/1997 | Starkovich et al. | 267/140.15 |
| 5,803,213 A | 9/1998 | Davis et al. | |
| 5,887,858 A * | 3/1999 | Su | 267/122 |
| 5,918,865 A | 7/1999 | Osterberg | |
| 5,947,240 A | 9/1999 | Davis et al. | |
| 6,003,849 A | 12/1999 | Davis et al. | |
| 6,022,005 A * | 2/2000 | Gran et al. | 267/136 |
| 6,354,576 B1 | 3/2002 | Jacobs et al. | |

FOREIGN PATENT DOCUMENTS

| | | |
|---|---|---|
| FR | 2526397 A | 11/1983 |
| GB | 2166103 A | 4/1986 |

* cited by examiner

Primary Examiner—Tien Dinh
(74) Attorney, Agent, or Firm—Ingrassia Fisher & Lorenz

(57) ABSTRACT

A spacecraft system including a spacecraft assembly or "stack" having an upper stage of a rocket-powered launch vehicle providing a final boost phase during launch. The stack also includes a payload structure rotatably interconnected with the upper stage. The upper stage and the payload structure together define a central axis that is generally coincident with the thrust axis during launch. The stack has an axis of maximum moment of inertia that is not parallel to the central axis. The stack has internal damping such that unstable nutation occurs if the upper stage and the payload structure rotate together about the central axis at the same rotational rate and in the same direction. The system includes a controller that rotates the payload structure relative to the upper stage during the final boost phase to alleviate coning motion of the stack.

24 Claims, 4 Drawing Sheets

MOMENTUM STABILIZED LAUNCH VEHICLE UPPER STAGE

CROSS-REFERENCES TO RELATED APPLICATIONS

The present application claims the benefit of U.S. Provisional Application No. 60/439,834, entitled SPIN STABILIZED SPACECRAFT, filed on Jan. 14, 2003, the entire contents of which are incorporated herein by reference.

BACKGROUND

Satellites or other spacecraft are commonly mounted to a launch-vehicle upper stage that places the satellite in orbit during the final launch or boost phase. Such upper stages have been stabilized by spinning the spacecraft and launch vehicle upper stage together about a spin axis. However, the spacecraft and launch vehicle each typically contain a propellant tank having fluid therein that dissipates kinetic energy, leading to instability. Such instability causes the system's spin axis to deviate from its desired longitudinal orientation, coning further outward during the course of the spin. Even a few degrees of coning can result in several kilometers of error in the final orbit. Incorporating sufficient propellant margin to accommodate such coning can require on the order of about 100 kg of fuel, which the upper-stage tanks may not be able to accommodate. Furthermore, large cone angles can cause significant error in not only altitude but also orbital inclination and ascending node. If the coning becomes severe enough, a complete tumble can result. If this occurs, the spacecraft is generally lost, causing a premature end of the mission. Furthermore, substantial time and resources may be required to predict the coning behavior of a given spacecraft and launch vehicle upper stage. If the launch vehicle and spacecraft (payload) fluid motions are incompatible, extensive analysis, testing and the like may be required.

SUMMARY

A spacecraft system is provided that includes a spacecraft/launch-vehicle stack having an upper stage of a rocket-powered launch vehicle providing a final boost phase during launch. The stack also includes a payload structure, such as a satellite, rotatably interconnected with the upper stage. The upper stage and the payload structure together define a central axis that is generally coincident with the thrust axis during launch. The stack has an axis of maximum moment of inertia that is not parallel to the central axis. The stack has internal damping such that unstable nutation occurs if the upper stage and the payload structure rotate together about the central axis at the same rotational rate and in the same direction. The system includes a controller that rotates the payload structure relative to the upper stage during the final boost phase to alleviate coning motion of the stack.

A spacecraft is also provide that includes a payload structure and an upper-stage launch vehicle rotatably interconnected with the payload structure for rotation relative to the payload structure about a spin axis. The launch vehicle includes a rocket motor that powers the launch vehicle during its final ascent stage. The spacecraft includes a powered actuator configured to rotate the launch vehicle relative to the payload structure. A release mechanism is selectively actuated to separate the payload structure from the launch vehicle, and a controller actuates the powered actuator and rotates the payload structure relative to the launch vehicle during the upper launch stage.

A spacecraft is further provided that includes a payload structure and an upper-stage launch vehicle without a rotational joint—that is, connected in the traditional manner—but with a momentum wheel, reaction wheel, or wheels, or other similar device for storing angular momentum. Through its impact on the dynamics of the coupled spacecraft/launch-vehicle/wheel system, this wheel or wheels stabilize the combined spacecraft and launch vehicle system during the final boost phase. This impact is mathematically substantially identical to what can be achieved with a rotational joint but may utilize existing actuators on the spacecraft or payload, leading to an overall lighter solution.

These and other features, advantages, and objects of the present invention will be further understood and appreciated by those skilled in the art by reference to the following specification, claims, and appended drawings.

DETAILED DESCRIPTION

Figure 1:
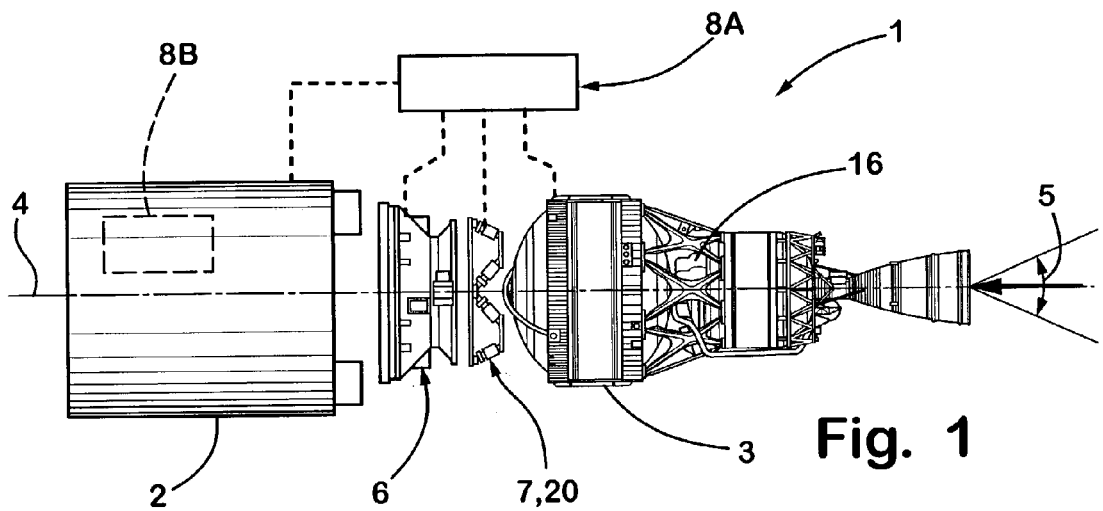
FIG. 1 is a partially schematic view of a spacecraft system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Spacecraft Dynamics

A familiar principle in spacecraft dynamics is that a rigid body spinning about an axis aligned with its minimum moment of inertia is unstable in the presence of energy dissipation. This configuration represents a kinetic-energy maximum, such that any loss of energy forces the system to diverge from this spin. With reference to FIG. 1, a spacecraft assembly or stack includes a payload structure 2 such as a satellite, and an upper stage 3 of a launch vehicle. In general, in prior art systems the payload 2 is secured to the upper stage 3 utilizing a connector that rigidly interconnects the two structures in a manner that does not permit relative moment. The payload structure 2 and upper stage 3 are generally spun together about a spin axis 4 during the upper stage of the launch to help stabilize the stack. However, such forward-mounted payloads and launch vehicles together generally have a long, thin shape such that the stack spins about an axis aligned with or close to its minimum moment of inertia, creating an unstable system. Thus, the stack will tend to nutate in a "coning" manner at a coning angle 5. Large coning angles can cause significant error not only in altitude but also orbital inclination and ascending node. If the coning angle continues to increase, the stack will enter a flat spin about a maximum axis leading to a loss of the spacecraft.

In general, fluid motion in the satellite payload is responsible for coning growth, although fluids, such as cryogenics, in some upper-stage launch vehicle designs can also contribute to coning growth. Fuel tanks, heat pipes, and other fluid-filled cavities are naturally dissipative subsystems that interact with the spacecraft body in a way that transforms kinetic energy into heat and ultimately radiates it to space. This interaction depends largely on the rigid-body gyroscopic dynamics. The nutation mode, if coupled strongly with the fluid modes, can efficiently transfer kinetic energy into the fluid. Thus, the problem is one of forced resonance, where the forcing frequency is that of the nutation mode.

Spherical fuel tanks and simple heat pipe designs are readily analyzed, or at least their performance can be bounded based on prior flight data. Furthermore, spherical tanks tend to be relatively weak dampers. However, state-of-the-art-spacecraft often incorporate non-spherical tanks for volume efficiency, and such tanks rarely include baffles due to the weight of the baffles. Although such baffles can break up the fluid modes and reduce their coupling with the notational dynamics, such baffles are not generally included due to the aforementioned weight of the baffles. In addition, low spin speed dynamics can increase surface tension effects in the fluid dynamics. When the bond or Eötvös number is low, these effects can dominate the spinning dynamics, with the result that slosh damping is unexpectedly high.

Prior art dual-spin satellites generally include a spinning part (a rotor), and a non-spinning part (a platform) for stabilization. Such satellites' attitude dynamics can be stabilized when the rate of energy dissipation on the platform exceeds that of the rotor. This technique has been generalized to apply to any number of rotating bodies with relative spin rates. The rotating part of the system acts something like a momentum wheel, adding gyroscopic stiffness to the system and effectively augmenting the dynamics so that the system behaves as if it were a maximum axis spinner, naturally stable, rather than an unstable, minor axis spinner. Thus, the coning growth rate can be reduced, or even reversed.

Nutational Stability of Multi-Body Spinners

The following is for a vehicle with m bodies that are free to spin about a common axis. This derivation follows A. J. Iorillo's 1965 result. Let $H_0$ represent the system angular momentum about this spin axis. The $i^{th}$ body has a spin inertia $I_i$ and a frame $B_i$ fixed in the $i^{th}$ body has an angular velocity vector $\omega^{Bi/N}$ in an inertial frame N. For notational simplicity, the scalar It represents the inertial angular velocity of each body about the spin axis. The bodies are assumed to be of sufficient balance and symmetry that the total vehicle transverse inertia $I_t$ (the aggregate of the collection of spinning bodies) with respect to the vehicle mass center is constant in any of the $B_i$ frames. The component of $\omega^{Bi/N}$ transverse to the spin axis is $\omega_0$. The inertial nutation frequency $\omega_0$ of such a system is then:

$$\lambda_0 = \frac{H_0}{I_t} = \frac{\sum_{i=1}^{m} I_i \omega_i}{I_t}. \tag{1}$$

The angular momentum and kinetic energy are expressed as:

$$H^2 = \left(\sum_{i=1}^{m} I_i \omega_i\right)^2 + (I_t \omega_0)^2 \tag{2}$$

and:

$$2E = \sum_{i=1}^{m} I_i \omega_i^2 + I_t \omega_0^2 \tag{3}$$

Assuming no external torques, so that angular momentum is constant in N, leads to:

$$\frac{d}{dt} H^2 = 2I_t \left(\lambda_0 \sum_{i=1}^{m} I_i \dot\omega_i + I_t \dot\omega_0 \omega_0\right) = 0 \tag{4}$$

The rate of energy dissipation $\dot E$ is therefore:

$$\dot E = \sum_{i=1}^{m} I_i \dot\omega_i \omega_i + I_t \dot\omega_0 \omega_0 \tag{5}$$

Substituting from equation (4) leads to:

$$\dot E = \sum_{i=1}^{m} \dot E_i = \sum_{i=1}^{m} (\omega_i - \lambda_0) I_i \dot\omega_i = -\sum_{i=1}^{m} \lambda_i I_i \dot\omega_i \tag{6}$$

where $\lambda_i = \lambda_0 - \omega_i$ is the nutation frequency observed in the $i^{th}$ rotating body frame $B_i$. Therefore:

$$I_i \dot\omega_i = -\frac{\dot E_i}{\lambda_i} \tag{7}$$

Substituting (7) into (4) yields:

$$I_i \dot\omega_0 \omega_0 = \lambda_0 \sum_{i=1}^{m} \frac{\dot E_i}{\lambda_i} \quad (8)$$

Because $\dot E_i$ is negative when kinetic energy is being dissipated, the right-hand side of this relation is negative, indicating that the transverse rate $\omega_0$ (a manifestation of coning) decreases when $$\frac{\lambda_0}{\lambda_i} = \frac{\lambda_0}{\lambda_0 - \omega_i} > 0.$$

Under these conditions, the collection of spinning bodies tends toward an equilibrium spin about the common spin axis; i.e., the attitude dynamics are passively stable. Thus, the passive energy dissipation in the $i^{th}$ body $\dot E_i$ is stabilizing if the inertial spin $\omega_i$ is (a) opposite $\omega_0$ or (b) in the same direction as $\omega_0$ but slower. If the sign of $H_0$ is taken to be positive (which requires only that an inertial coordinate system be defined in which this is true), then passive stability requires only that $\lambda_0 > \omega_i$. This inequality has come to be known as the Iorillo criterion. In the context of this invention, a spinning body as described here may be a satellite mounted to a launch vehicle through a rotational joint, the launch vehicle itself, and/or other bodies (such as reaction wheels or momentum wheels) that provide similar momentum augmentation.

For the case of a launch vehicle with a spinning payload m=2, let the subscript p indicate the payload, and u indicate the upper stage. The Iorillo criterion is then:

$$\lambda_0 \left( \frac{\dot E_p}{\lambda_p} + \frac{\dot E_u}{\lambda_u} \right) < 0 \quad (9)$$

Coning does not grow when any of the following three conditions is met:

$\lambda_p, \lambda_u < 0$ $\lambda_p > 0, \lambda_u < 0$ and $\left|\frac{\dot E_p}{\lambda_p}\right| > \left|\frac{\dot E_u}{\lambda_u}\right|$ $\lambda_p < 0, \lambda_u > 0$ and $\left|\frac{\dot E_p}{\lambda_p}\right| < \left|\frac{\dot E_u}{\lambda_u}\right|$ Sensibly, these conditions assume that $H_0$ (and hence $\omega_0$) is positive and that the $\dot E_i$ are negative. Nevertheless, Equation (9) captures the general case for arbitrary parameters.

Introduction of Stabilizing Energy Dissipation with a Passive Damper

The Iorillo criterion has led to the development of explicit energy-damper hardware for space applications, from simple tuned-mass dampers to more sophisticated mercury-filled rings. The criterion does not require a particular design, only that energy dissipation result in torques of a certain magnitude that are applied within the appropriate rotating frame.

The equations of rotational motion of the two bodies, in more general terms, are $$I_p \cdot \frac{d_p}{dt} \omega_p + \omega_p \times I_p \cdot \omega_p = \tau_j + \tau_{dp} \quad (10)$$

$$I_u \cdot \frac{d_u}{dt} \omega_u + \omega_u \times I_u \cdot \omega_u = -\tau_j + \tau_{du} \quad (11)$$

where the dyadics $I_p$ and $I_u$ represent the payload and upper stage inertia about their respective mass centers; the vectors $\omega_p$ and $\omega_u$ represent the angular velocity of the payload-fixed frame and the stage-fixed frame in N; $\tau_j$ represents the torque applied at the joint; and $\tau_{dp}$ and $\tau_{du}$ represent the damping torques applied by internal energy-dissipating processes on the payload and the upper stage, respectively. The orientation, or attitude, of the payload frame relative to the upper-stage frame depends on the relative angular velocity $\omega^{p/u}$, and it can be computed by propagating any attitude representation (such as a quaternion). The direction-cosine matrix $^uQ^p$ can be used as an attitude representation. Its derivative is given by the differential equation:

$$^u\dot Q^p = (\omega^{p/u})^{x \, u} Q^p \quad (12)$$

where the superscript x indicates the skew-symmetric cross-product matrix in the components of the argument, i.e.:

$$(\omega^{p/u})^x = \begin{bmatrix} 0 & -\omega_3^{p/u} & \omega_2^{p/u} \\ \omega_3^{p/u} & 0 & -\omega_1^{p/u} \\ -\omega_2^{p/u} & \omega_1^{p/u} & 0 \end{bmatrix} \quad (13)$$

With this formulation, a differential equation in the small attitude motions of the interface stiffness and damping can be developed and the energy dissipation rate established.

The energy-dissipation rate of an explicit damping device is often well understood. That is, E (t) can be a relatively simple function of the system parameters. For example, given an n degree-of-freedom system described by the n×n mass, damping and stiffness matrices M, C, and K, and the equations of motion for free vibration in physical coordinates are:

$$M\ddot x + C\dot x + Kx = 0 \quad (14)$$

The energy (the sum of kinetic and potential) is:

$$E = 1/2 \dot x^T M \dot x + 1/2 x^T K x \quad (15)$$

and the derivative is:

$$\dot E = \dot x^T M \ddot x + \dot x^T K x = -\dot x^T C \dot x \quad (16)$$

Considering only the kinetic-energy dissipation rate to be relevant adds the term $-\dot x^T kx$, but this term is oscillatory and, in a gross sense, the sum is represented adequately with $-\dot x^T C \dot x$. Thus, a prediction of the modal damping yields a simple estimate of the dissipation rate of an explicit damping device that can be represented as a linear system.

Active Actuation to Introduce Stabilizing Energy Dissipation

In the case of a simple rotational joint, the interface torque $\tau_j$ in equations (10) and (11) consists of a motor torque about the spin axis and constraint torques normal to the spin axis. These constraint torques merely ensure that the two rotating bodies stay connected. However, incorporating actuators in series with the rotational joint opens up many more possibilities for $\tau_j$. These actuators may be electromechanical, hydraulic, or any number of other technologies. In particular, $\tau_j$ can be driven in a way that applies torques to each body characteristic of a stable dual-spin system.

As an example, consider that $\tau_j$, as applied by the actuators, is chosen to be:

$$\tau_j = \tau_{du} \quad (17)$$

Where it is assumed (for this example only) that $\tau_{du}$ is known. Then the equations of motion become:

$$I_p \cdot \frac{d_p}{dt}\omega_p + \omega_p \times I_p \cdot \omega_p = \tau_{dp} + \tau_{du} \quad (18)$$

$$I_u \cdot \frac{d_u}{dt}\omega_u + \omega_u \times I_u \cdot \omega_u = 0 \quad (19)$$

In this example, the payload's damping is increased, while that of the upper stage is zeroed out. Therefore, with sufficiently low $\omega_p$, this system would be stable.

The Iorillo criterion makes no demands on the design of the energy-dissipating damper. Thus, the torques characteristic of any damper can be applied, physically realizable or not, through $\tau_j$. The present example proceeds with a mathematically convenient damper model, the Kane Damper, to show how such behavior can be incorporated. Other damping equations are, of course, just as valid.

The Kane damper is a mathematical model consisting of a spherical inertia $I_d$ (the inertia matrix is diagonal, and all nonzero entries are equal) and a damping constant c. Because it is spherical, the damper's inertia matrix is constant in all frames. Therefore, in developing the equations of motion, the derivative of the damper's angular momentum is taken with respect to any convenient frame. For the payload:

$$I_{dp} \cdot \frac{d_p}{dt}\omega_{dp} + \omega_p \times I_{dp} \cdot \omega_{dp} = -\tau_{kp} \quad (20)$$

and $$\tau_{kp} = c_p(\omega_{dp} - \omega_p) \quad (21)$$

where $\omega_{dp}$ is the angular velocity of the spherical body. By inspection, the damper's torques are effective until the system reaches a relative equilibrium in which $\omega_{dp} = \omega_p$.

Similar equations can be developed for the upper stage. The joint torque is chosen to be:

$$\tau_j = c_p(\omega_{du} - \omega_p) - c_u(\omega_{du} - \omega_u) \quad (22)$$

The resulting system equations of motion are therefore:

$$I_p \cdot \frac{d_p}{dt}\omega_p + \omega_p \times I_p \cdot \omega_p = \tau_{dp} + c_p(\omega_{du} - \omega_p) - c_u(\omega_{du} - \omega_u) \quad (23)$$

and $$I_u \cdot \frac{d_u}{dt}\omega_u + \omega_u \times I_u \cdot \omega_u = \tau_{du} - c_p(\omega_{du} - \omega_p) + c_u(\omega_{du} - \omega_u) \quad (24)$$

The active compensation now includes six states, the angular velocity of the two virtual damper bodies described in equations (20) and (21). It remains for the user to select the damping coefficient and the dampers' virtual inertias. The selection is such that the Iorillo criterion is satisfied for the angular velocities imposed by other system requirements, such as separation kinematics and thermal/power constraints.

Utilizing Dual Spin Dynamics to Stabilize Spacecraft

As discussed above, a stack (FIG. 1) generally includes a payload 2 such as a satellite, and the upper stage of a launch vehicle 3. In the illustrated example, the stack 1 includes a payload spin assembly 6 ("PSA") that is discussed in more detail below in connection with FIG. 2. The PSA 6 includes an electrical drive motor that spins the payload 2 relative to the launch vehicle upper stage 3. Although the PSA 6 is a prior art device, the PSA 6 has previously been utilized to spin a payload 2 relative to the launch vehicle upper stage 3 after the upper stage 3 has completed the upper stage of the launch. Thus, in prior applications, the PSA 6 was utilized to spin the payload or satellite 2 immediately prior to separation from the launch vehicle 3 to provide rotational stability for the satellite 2 after separation from the launch vehicle 3. The satellite assembly 1 may also include a vibration-isolating structure 7 having springs and/or dampers to reduce the vibration loads in the satellite 2. Alternately, as discussed in more detail below, an active load isolation device 20 may be utilized instead of the passive spring and damper load isolation structure. Examples of spin and damper load isolating apparatuses are illustrated in U.S. Pat. Nos. 5,803,213; 5,918,865; and 5,947,240, the entire contents of each of which are hereby incorporated by reference. The stack 1 further includes a controller 8A that is illustrated schematically in FIG. 1 for purposes of the present description. In the illustrated example, controller 8A takes the form of a ground-based unit that is operably coupled to the spacecraft via radio signals. However, the controller could also comprise an on-board unit mounted within the stack and operably connected to the PSA 6, vibration-isolating structure 7, and launch vehicle 3.

Figure 2:
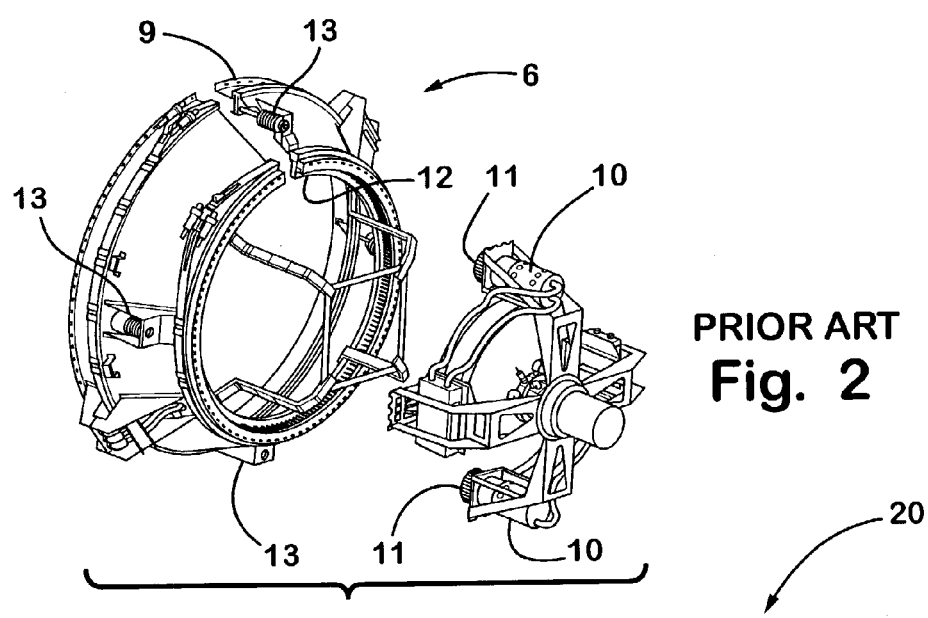
FIG. 2 is an exploded perspective view of a prior art payload spin assembly utilized to spin a payload immediately prior to separation from the upper stage of a launch vehicle.

With reference to FIG. 2, the PSA 6 includes a motor adapter ring 9 for connection to the upper stage 3 of a launch vehicle. A pinion 11 is mounted to an electric drive motor 10, and engages a ring gear 12 to provide for powered, controlled rotation of the payload structure 2 relative to the launch vehicle 3. Four separation springs 13 provide for separation of the satellite 2 from the launch vehicle upper stage 3. The illustrated PSA can spin the payload 2 up to about 70 rpm relative to the upper stage 3.

Figure 3:
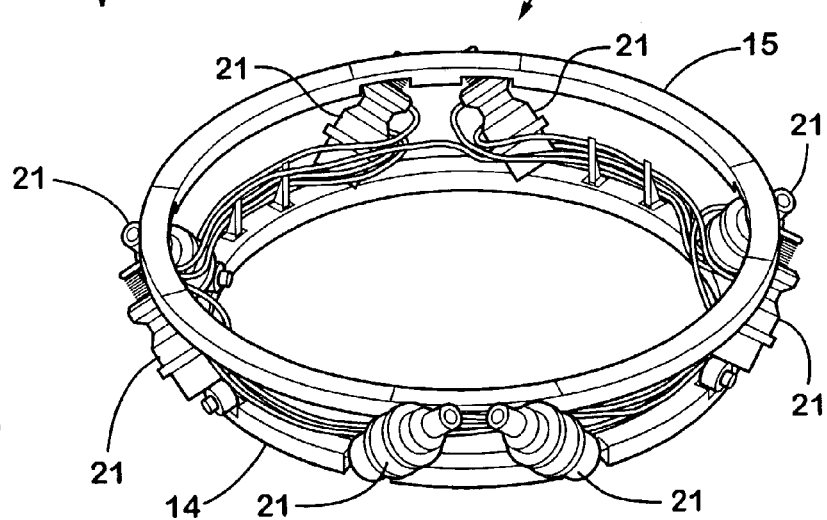
FIG. 3 is a perspective view of a powered apparatus utilized to interconnect a payload to an upper stage of a launch vehicle to provide active reduction of coning according to one aspect of the present invention.

With further reference to FIG. 3, an active load isolating device 20 includes a first ring 14 configured to attach to the launch vehicle upper stage 3. The load isolating structure 7 also includes a second ring 15 configured to be secured to either the PSA 6 (FIG. 2), or directly to the payload structure 2. As discussed above, load isolating structures 7 including dampers and springs are known. However, unlike prior "passive" load isolating structures, the active load-isolating device 20 includes a plurality of powered actuators 21 interconnecting the first ring 14 and the second ring 15 to provide constraint torques normal to the spin axis 4. Although a variety of powered struts 21 could be utilized to provide powered, active control, a preferred form of the struts 21 is disclosed in U.S. Pat. No. 6,354,576, the entire contents of which are hereby incorporated by reference. This type of powered strut 21 includes both active and passive vibration isolation. Further examples of damping mechanisms are disclosed in U.S. Pat. Nos. 5,249,783; 5,332,070; and 6,003,849, the entire disclosures of each of which are hereby incorporated by reference.

Figures 4, 5, 6:
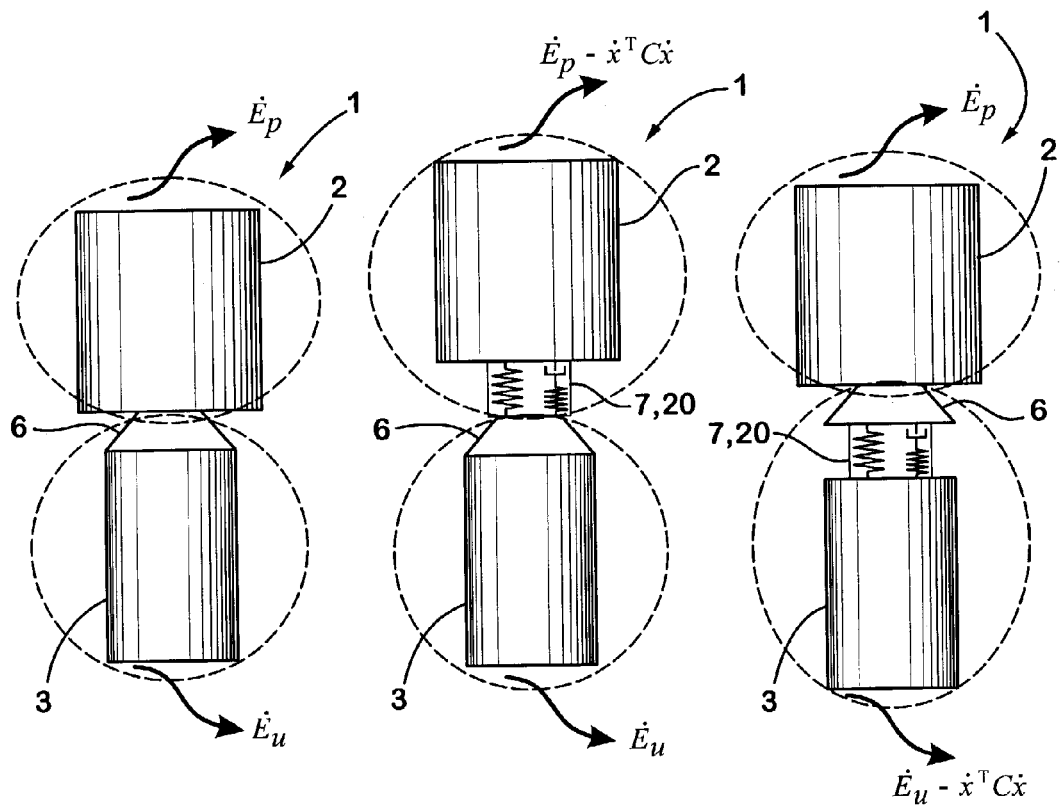
FIG. 4 is a schematic view of a payload and launch vehicle that are rotatably interconnected.
FIG. 5 illustrates a payload and launch vehicle that are rotatably interconnected, wherein a spring and damper apparatus is secured to the payload.
FIG. 6 illustrates a payload and launch vehicle that are rotatably interconnected, wherein a spring and damper apparatus is secured to the launch vehicle.

With reference to FIGS. 4–6, various combinations of the PSA 6 and/or load isolating structure 7 and/or active load isolation device 20 can be utilized to interconnect the payload 2 to the launch vehicle upper stage 3. In the example illustrated in FIG. 4, the payload structure 2 is interconnected to the launch vehicle upper stage 3 by the PSA 6, without utilizing a passive isolator 7, and without utilizing an active isolator 20. When the configuration of FIG. 4 is utilized, the PSA 6 is utilized to spin the payload 2 relative to the launch vehicle 3 at a rotational rate that satisfies the Iorillo criteria described above in equation (9). In the illustrated example, the PSA 6 is a powered spin unit including electrical motors as described in more detail above. However, an unpowered spin table could also be utilized to interconnect the payload structure 2 to the launch vehicle 3. Such unpowered spin tables are known in the art, and represent commercially available, "off-the-shelf" parts. When an unpowered spin table is utilized, the launch vehicle 3 is spun up under rocket power to provide relative rotation between the payload structure 2 and the upper stage of the launch vehicle 3. A sufficient spin up is provided to ensure that the structure meets the Iorillo criterion described above.

Figure 7:
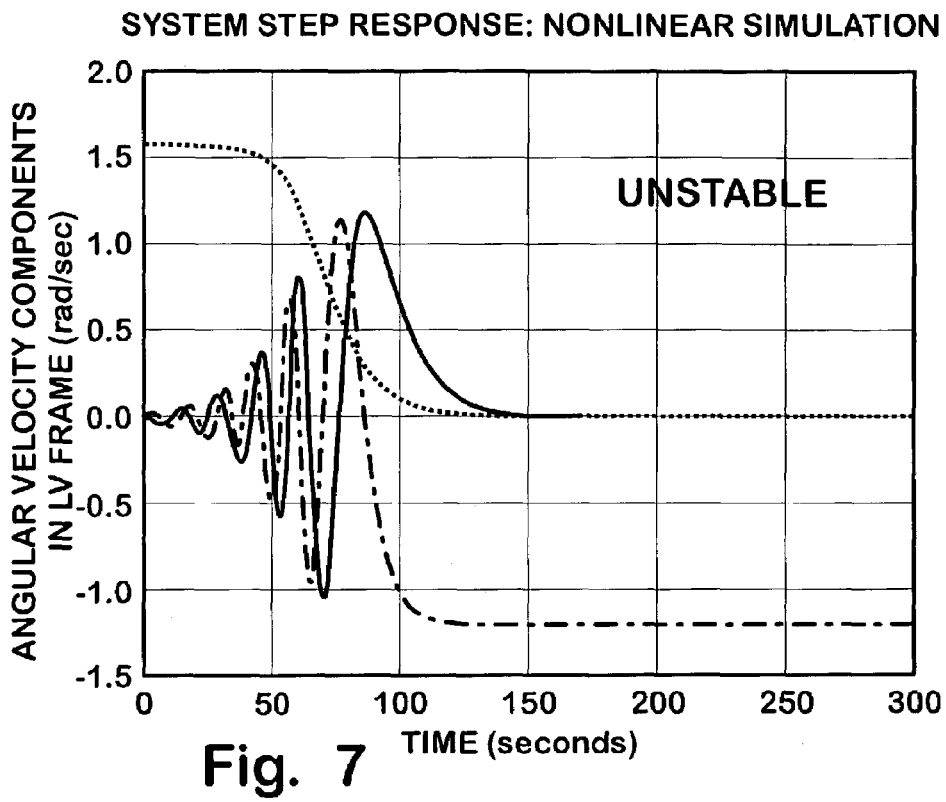
FIG. 7 is a graph of a computer simulation of an unstable spacecraft and launch vehicle upper stage.

With further reference to FIGS. 5 and 6, in addition to the PSA 6, a passive load isolating structure 7 or active load-isolating device 20 may also be utilized to interconnect the payload structure 2 to the launch vehicle 3. If a passive load isolating structure 7 is utilized, equations (10)–(16) describe the energy dissipation of the passive damper 7. Alternately, if the active load isolation device 20 is utilized, the system behavior and necessary controls are described in equations (17)–(24). The controller 8A or 8B is programmed according to these equations to ensure that the stack 1 is stable during the upper launch stage. Although the payload structure 2 is preferably spun at a sufficient angular rate relative to the launch vehicle upper stage 3 to satisfy the Iorillo criterion, for some applications it is possible to spin the payload structure 2 sufficiently to provide a relatively slow rate of growth of coning, such that the requirements for a particular launch may be met even the system is not completely stable. Thus, coning growth may be alleviated sufficiently to meet the requirements for a particular launch even though the system is not completely stable. FIG. 7 illustrates a results of a computer simulation of a payload structure and launch vehicle wherein the payload is rigidly interconnected to the launch vehicle such that the two structures rotate about the spin axis at the same rate. The computer simulation shows that the system eventually goes into a flat spin. Such a flat spin would generally result in a complete loss of a spacecraft mission in an actual spacecraft launch situation.

Figure 8:
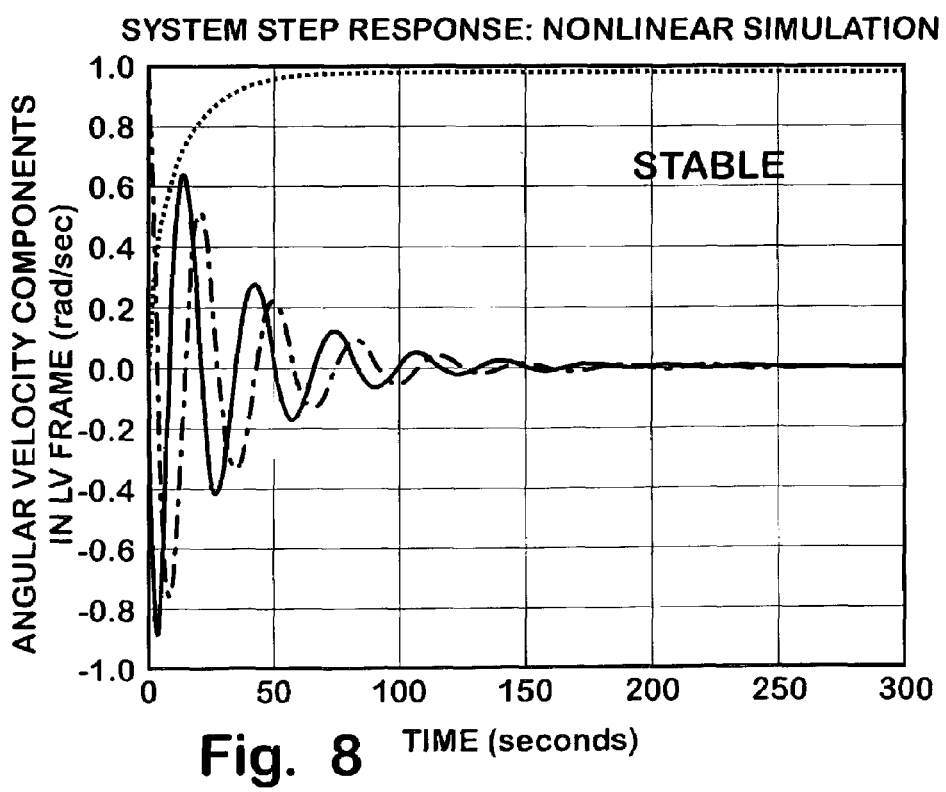
FIG. 8 is a graph of a computer simulation illustrating a stable payload and launch vehicle upper stage according to the present invention.

FIG. 8 illustrates the result of a computer simulation utilizing the same payload and launch vehicle structure models as used in FIG. 7. However, in FIG. 8 the payload structure is rotated relative to the upper stage of the launch vehicle. The relative rotation of the payload relative to the launch vehicle results in a stable system wherein the coning is reduced to zero, thereby providing a stable system.

In a preferred embodiment, the controller 8A or 8B provides a signal to the PSA to spin the payload 2 relative to the upper stage 3 at the beginning of the upper stage of the launch. The signal to spin the PSA could be given at about the same time as the rocket motor 16 of launch vehicle 3 is actuated. Alternately, the payload structure 2 could be spun up by the PSA immediately prior to firing of the rocket motor 16. In addition, the payload structure 2 may be spun up some time after actuation of the rocket motor 16. In general, the rocket motor 16 will be fired for a relatively short period to provide a "delta V" burn, followed by "coasting" of the launch vehicle structure 1. Thus, in general, the upper stage of the launch operation includes both a delta V portion, and a coasting portion. Upon completion of the coasting stage, the payload structure 2 is separated from the launch vehicle 3, and a final delta V is provided by a rocket motor on the payload structure 2 to place the payload structure 2 in the target or injection orbit.

Figure 9:
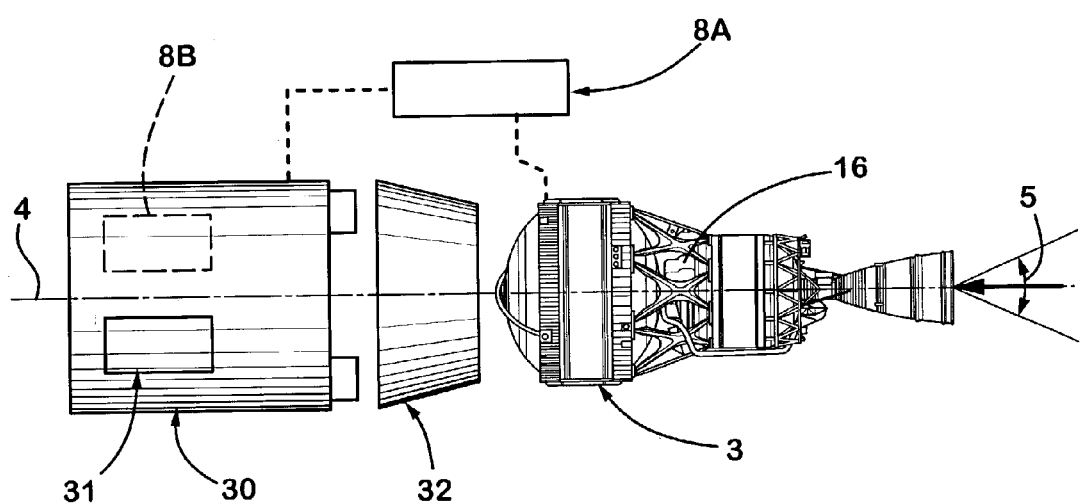
FIG. 9 is a partially schematic view of a spacecraft/launch vehicle system that is stabilized utilizing momentum wheels in a satellite.

With further reference to FIG. 9, a satellite 30 or other such payload structure may be secured to a launch vehicle upper stage 3. Satellite 30 includes an attitude control system 31 having a rotating member that stores annular momentum. Such momentum wheel control systems have been utilized for controlling the attitude of a satellite once it has reached its proper orbit. Such attitude control systems include at least one momentum wheel, and commonly include three or more momentum wheels to provide attitude control of the satellite or other space vehicle. In contrast to the various configurations described above, satellite 30 is connected to the launch vehicle 3 via a non-rotating connecting assembly 32 of a conventional design. The satellite 30 may be connected to the launch vehicle 3 directly by the connecting assembly 32. Alternately, an active isolator 20 such as illustrated in FIG. 3 may be utilized. The active isolator 20 may be positioned between the connecting assembly 32 and the satellite 30. Alternately, the active isolator 20 may be connected to the launch vehicle 3 and connecting assembly 32.

The controller 8A or 8B is programmed to actuate the attitude control system 31 to stabilize the system during the upper stage of the launch. The attitude control system 31 can be actuated immediately prior to firing of the rocket motor 16, or after actuation of the rocket motor 16. Alternately, the attitude control system 31 could be actuated at about the same time as the rocket motor 16 of launch vehicle 3.

The general principles governing control of a space vehicle utilizing a momentum wheel attitude control system 31 are known. Thus, the controller 8A or 8B is programmed to control the attitude of the satellite 30 and launch vehicle 3 during the upper stage of the launch in substantially the same manner as when the satellite 30 is in orbit. However, the controller takes into account the added mass, damping characteristics and the like of the launch vehicle 3 in determining the proper control inputs. In addition, the mass of the system changes substantially as the propellant of rocket motor 16 is burned, such that the control inputs vary to account for the changing dynamic properties of the system.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A spacecraft system, comprising:
a stack including an upper stage of a rocket powered launch vehicle providing a final boost phase during launch; a payload structure rotatably interconnected with said upper stage, said upper stage and said payload structure together defining a central axis that is generally coincident with the launch axis during launch, said stack defining an axis of maximum moment of inertia that is not parallel to said central axis and having internal damping such that unstable nutation occurs if said upper stage and said payload structure rotate together about said central axis at the same rotational rate and direction;

said system including a controller that rotates said payload structure relative to said upper stage during the final boost phase and alleviates coning motion of the stack.

2. The spacecraft system of claim 1, wherein said controller is positioned on the earth and communicates with said stack via a radio signal.

3. The spacecraft system of claim 1, wherein said controller is on-board, and forms a part of said stack.

4. The spacecraft system of claim 1, including a motor providing powered rotation of said payload structure relative to said upper stage during the final boost phase.

5. The spacecraft system of claim 1, including a vibration isolation apparatus between said payload structure and said upper stage, said vibration isolation apparatus including a plurality of dampers and spring members.

6. The spacecraft system of claim 5, including a powered drive assembly rotatably interconnecting said upper stage and said payload structure.

7. The spacecraft system of claim 6, wherein said powered drive assembly is connected to said payload structure and to said vibration isolation apparatus, said vibration isolation apparatus being connected to said upper stage.

8. The spacecraft system of claim 6, wherein said vibration isolation apparatus is connected to said payload structure and to said powered drive assembly, said powered drive assembly being connected to said upper stage.

9. The spacecraft system of claim 1, including at least one powered actuator interconnecting said payload structure with said upper stage; and wherein said controller actively controls said actuator to alleviate nutation of said stack during the final boost phase.

10. The spacecraft system of claim 9, wherein said powered actuator comprises an electrically powered extendable strut.

11. The spacecraft system of claim 1, wherein said payload structure rotates relative to said upper stage at a rate that satisfies the Iorillo criterion during at least a portion of the final boost phase such that said stack is dynamically stable with respect to coning motion.

12. A spin stabilized spacecraft, comprising:
a payload structure;
a launch vehicle having an upper stage, said launch vehicle rotatably interconnected with said payload structure for rotation relative to said payload structure about a spin axis, said launch vehicle including a motor that powers said launch vehicle during a final boost phase;
a powered actuator configured to rotate said launch vehicle relative to said payload structure;
a release mechanism that is selectively actuated to separate said payload structure from said launch vehicle; and
a controller configured to actuate said powered actuator and rotate said payload structure relative to said upper stage to alleviate coning motion of said upper stage during said final boost phase.

13. The spacecraft of claim 12, including:
at least one powered actuator interconnecting said payload structure and said launch vehicle structure and generating a moment between the payload structure and the launch vehicle structure that is normal to said spin axis; and wherein said controller selectively actuates said powered actuator to reduce coning growth during said final boost phase.

14. The spacecraft of claim 13, wherein said spacecraft includes a load isolator apparatus having at least one spring and at least one damper interconnecting said payload structure to said launch vehicle structure and dissipating energy to reduce coning.

15. The spacecraft of claim 14, wherein said load isolator dissipates sufficient energy to ensure nutational stability.

16. A launch vehicle system, comprising:
a stack including an upper stage of a rocket powered launch vehicle providing a final boost phase during launch; and a payload structure rotatably interconnected with said upper stage, said upper stage and said payload structure together defining a central axis that is generally coincident with the launch axis during launch, said stack defining an axis of maximum moment of inertia that is not parallel to said central axis and having internal damping such that unstable nutation occurs if said upper stage and said payload structure rotate together about said central axis at the same rotational rate and direction;
said payload structure including an attitude control system having a rotating member that stores angular momentum; and
a controller operably connected to said attitude control system, said controller configured to rotate said payload structure relative to said upper stage to alleviate coning motion of the stack during the final boost phase.

17. The launch vehicle system of claim 16, wherein said controller is positioned on the earth and communicates with said stack via a radio signal.

18. The launch vehicle system of claim 16, wherein said controller on-board, and forms a part of said stack.

19. The launch vehicle system of claim 16, including a vibration isolation apparatus between said payload structure and said upper stage, said vibration isolation apparatus including a plurality of dampers and spring members.

20. The launch vehicle system of claim 19, including a powered drive assembly rotatably interconnecting said upper stage and said payload structure.

21. The launch vehicle system of claim 20, wherein said powered drive assembly is connected to said payload structure and to said vibration isolation apparatus, said vibration isolation apparatus being connected to said upper stage.

22. The launch vehicle system of claim 20, wherein said vibration isolation apparatus is connected to said payload structure and to said powered drive assembly, said powered drive assembly being connected to said upper stage.

23. The launch vehicle system of claim 16, including at least one powered actuator interconnecting said payload structure with said upper stage; and wherein said controller actively controls said actuator to alleviate nutation of said stack during the final boost phase.

24. The launch vehicle system of claim 23, wherein said powered actuator comprises an electrically powered extendable strut.

* * * * *